(12) United States Patent
Pinson

(10) Patent No.: US 7,188,778 B2
(45) Date of Patent: Mar. 13, 2007

(54) MACHINE-READABLE SYMBOL AND RELATED METHOD

(75) Inventor: Mark Pinson, Chatsworth, CA (US)

(73) Assignee: Codemagic, Chatsworth, CA (US)

( * ) Notice: Subject to any disclaimer, the term of this patent is extended or adjusted under 35 U.S.C. 154(b) by 338 days.

(21) Appl. No.: 10/800,198

(22) Filed: Mar. 12, 2004

(65) Prior Publication Data

US 2004/0200904 A1   Oct. 14, 2004

Related U.S. Application Data

(63) Continuation-in-part of application No. 10/245,654, filed on Sep. 16, 2002, now abandoned.

(60) Provisional application No. 60/322,911, filed on Sep. 17, 2001.

(51) Int. Cl.
*G06K 19/06* (2006.01)

(52) U.S. Cl. .................... 235/494; 235/460; 235/454; 235/487

(58) Field of Classification Search ................ 235/494, 235/454, 460, 456, 487, 469; 382/165, 166, 382/162, 100
See application file for complete search history.

(56) References Cited

U.S. PATENT DOCUMENTS

| | | | |
|---|---|---|---|
| 4,998,010 A | 3/1991 | Chandler et al. | |
| 5,288,986 A | 2/1994 | Pine et al. | |
| 5,416,308 A * | 5/1995 | Hood et al. | 235/454 |
| 5,507,526 A | 4/1996 | Tomioka et al. | |
| 5,568,555 A | 10/1996 | Shamir | |
| 5,612,524 A * | 3/1997 | Sant'Anselmo et al. | 235/494 |
| 5,629,990 A * | 5/1997 | Tsuji et al. | 382/324 |
| 5,684,885 A | 11/1997 | Cass et al. | |
| 5,818,032 A | 10/1998 | Sun et al. | |
| 5,946,414 A | 8/1999 | Cass et al. | |
| 5,992,748 A | 11/1999 | Takahashi et al. | |
| 6,000,614 A | 12/1999 | Yang et al. | |
| 6,119,937 A | 9/2000 | Wang et al. | |
| 6,131,807 A * | 10/2000 | Fukuda et al. | 235/494 |
| 6,141,441 A | 10/2000 | Cass et al. | |
| 6,234,392 B1 | 5/2001 | Marakami | |
| 6,269,183 B1 * | 7/2001 | Matoba et al. | 382/166 |
| 6,302,329 B1 | 10/2001 | Iwai et al. | |
| 6,330,976 B1 | 12/2001 | Dymetman et al. | |
| 6,438,251 B1 | 8/2002 | Yamaguchi | |

(Continued)

*Primary Examiner*—Thien M. Le
*Assistant Examiner*—Edwyn Labaze
(74) *Attorney, Agent, or Firm*—Kelly Lowry & Kelley, LLP

(57) ABSTRACT

A machine readable symbol includes a data field of arranged data cells. Each data cell is assigned a data pattern value or a finder pattern value. Preferably, at least some of the data cells, or even all of the data cells, include at least one data pattern value and a finder pattern value which are overlapping. A color corresponding to the data pattern value, finder pattern value, or overlapping data pattern value and finder pattern value is assigned to each data cell. A finder pattern is discernable when the symbol is placed under a first color filter, or exposed to a first color, or the symbol image is processed by a first software color filter of an electronic device. A data pattern is discernable when the symbol is placed under a second color filter, or exposed to a second color, or the symbol image is processed by a second software color filter.

29 Claims, 4 Drawing Sheets

| | | Finder Pattern Values | |
|---|---|---|---|
| | | 0 | 1 |
| Data Pattern Values | 0 | WHITE | GREEN |
| | 1 | RED | BLUE |

U.S. PATENT DOCUMENTS

| | | |
|---|---|---|
| 6,533,181 B1 | 3/2003 | Roxby et al. |
| 6,601,772 B1 | 8/2003 | Rubin et al. |
| 7,020,327 B2 * | 3/2006 | Tack-don et al. ........... 382/162 |
| 7,028,911 B2 * | 4/2006 | Cheung et al. ............. 235/494 |
| 2003/0112471 A1 * | 6/2003 | Damera-Venkata et al. ...... 358/3.28 |
| 2006/0202038 A1 * | 9/2006 | Wang et al. ........... 235/462.24 |
| 2006/0231635 A1 * | 10/2006 | Kim et al. .................. 235/494 |

* cited by examiner

FIG. 5

| Data Pattern Values | | Finder Pattern Values | |
|---|---|---|---|
| | | 0 | 1 |
| | 0 | WHITE | GREEN |
| | 1 | RED | BLUE |

FIG. 6

| B | R | B | R | B | R | B |
|---|---|---|---|---|---|---|
| R | G | W | G | W | G | R |
| B | W | B | R | B | W | B |
| R | G | R | B | R | G | R |
| B | W | B | R | B | W | B |
| R | G | W | G | W | G | R |
| B | R | B | R | B | R | B |

MACHINE-READABLE SYMBOL AND RELATED METHOD

RELATED APPLICATION

This application is a continuation-in-part application of U.S. application Ser. No. 10/245,654, filed Sep. 16, 2002 now abandoned, which claims priority from U.S. provisional application Serial No. 60/322,911, filed Sep. 17, 2001.

BACKGROUND OF THE INVENTION

The present invention is generally directed to machine-readable symbols. More particularly, this invention is directed to an identification symbol that can be used on items to be identified and more particularly, to a symbol that includes an orientation finder pattern integrated with data cells and a method for recognizing and decoding the information represented by the symbol.

Machine-readable symbols are well known and commonly used to identify and track products through manufacturing, storage, distribution, and in retail transactions. Probably the best-known example is the use of bar codes to automate checkout and inventory tracking in the grocery store. Traditional bar codes encode characters or digits as patterns of parallel bars of various widths in a single row. Such bar codes, known as "linear bar codes" are scanned and decoded by examining the reflections of the bars along a line roughly perpendicular to the bars of the symbol. The overall width of linear bar code symbols is roughly proportional to the number of characters or digits encoded. However, the linear relationship between the width of the bar code symbol and the data it contains limits the practical data capacity of linear bar code symbols.

Several machine-readable symbols have been introduced which overcome the limited capacity of linear bar codes by representing the encoded data in a two-dimensional matrix pattern. Generally, these two-dimensional symbols graphically represent a binary encoding of the data in contrasting colors—one color for a bit value of "1" and a contrasting color for a bit value of "0". Such "two-dimensional" symbols generally have much higher data densities and capacities than linear bar codes.

In addition to the encoded data, the symbols typically have other graphic indicia called a "finder pattern" which is used to determine the position and orientation of the data cells. A good finder pattern has characteristics that allow the position, orientation, and scale of the data cells to be determined accurately with a minimum amount of computation. However, the finder patterns in prior art symbols add spatial overhead and reduce data density. Although a finder pattern adds spatial overhead, symbols that lack a finder pattern, such as those symbols disclosed in U.S. Pat. No. 5,946,414 to Cass et al., rely on calibration and alignment of the marking device and the reader to determine orientation and scale. Essentially, when lacking a finder pattern, an exhaustive search of the image by the reader must be conducted to determine proper position and orientation. Thus, it will be appreciated by those skilled in the art that both the traditional practice of adding a finder pattern and the omission of the finder pattern present drawbacks.

For several reasons, at the time of decoding, the cells within the symbol matrix may not accurately represent the intended binary pattern. For example, if the symbol is scratched or partly covered with foreign matter the "light cells" may appear to be "dark cells" or vice versa. To allow accurate recovery of the original information when damage occurs to the data cells, known symbols typically include additional information such as Reed-Solomon Error Detection And Correction (EDAC) code words. Inclusion of such EDAC information allows the recovery of the original information so long as the amount of damage does not exceed the error correcting capacity of the EDAC technique employed. However, symbol damage occurring in the finder pattern is not corrected and may render the symbol unreadable (even if there is no damage to the data areas of the symbol) if the damage interferes with the characteristic used to find the symbol. Finder patterns that rely on the detection of small details are more vulnerable to damage because even a small amount of damage may obliterate the detail. Symbols with larger finder patterns can tolerate more finder pattern damage but in all known symbols this increased tolerance comes with the price of lower data density.

Accordingly, there is a continuing need for a machine readable symbol design that allows increased data density and improved tolerance to damage in both the data and finder patterns. There is also a need for a symbol design which increases the error detection and correction capability by providing additional means of recognizing the location of damage. What is further needed is the increase of efficiency and reliability of the finder pattern. Also, means to encode a plurality of messages within the same graphic symbol are needed. The present invention fulfills these needs and provides other related advantages.

SUMMARY OF THE INVENTION

The present invention resides in a machine readable symbol which fulfills the aforementioned needs and provides benefit over other two-dimensional machine readable symbols. The invention includes the creation of a data field having a plurality of data cells. Typically, the data field is a rectilinear data field. The plurality of data cells are arranged into a matrix. Data patterns and finder patterns are represented as two-dimensional arrangements of binary values. For patterns whose values are not inherently binary, the values are represented as a sequence of binary values, or alternatively as a set of separate binary data patterns. One or more data patterns and a finder pattern are mapped to the data field by associating each binary value from each data pattern or finder pattern to a particular data cell. In a particularly preferred embodiment, in at least a subplurality of the data cells, both a data pattern value and a finder pattern value are mapped to the same data cell. In fact, each data cell can be mapped from multiple data pattern values.

Each data cell is then assigned a color using a color assignment function. The color assignment function selects the assigned color based on each and every pattern value which has been mapped to that particular data cell. The specific colors assigned for each possible combination of values is chosen such that by use of color filters or special illumination that the binary state of each data value or finder pattern value becomes separately apparent.

The present invention uses the fact that a given "color" is perceived differently under different illumination or filtering conditions to encode multiple bits of information in the same space. Using this technique, a finder pattern, for example, may occupy the same physical area as a data pattern. By applying an appropriate filter, the finder pattern becomes separately apparent. Thus, finder patterns may be as large as the data pattern (making them more reliable) without adding any spatial over head.

Other features and advantages of the present invention will become apparent from the following more detailed description, taken in connection with the accompanying drawing which illustrate, by way of example, the principals of the present invention.

BRIEF DESCRIPTION OF THE DRAWINGS

The accompanying drawings illustrate the invention. In such drawings:

FIG. 5 illustrates a function used to determine cell color from the values of the data pattern and the values of the finder pattern;

FIG. 6 illustrates the assignment of cell colors in the resultant symbol;

DETAILED DESCRIPTION OF THE PREFERRED EMBODIMENTS

The present invention resides in a system that captures an image of a two-dimensional machine readable symbol 10 having a data pattern and finder pattern to enable determination of symbol orientation, as well as the decoding of the contents of the symbol 10 so as to output the decoded contents of the symbol 10 to a display reader device (not shown). The present invention is intended to increase data density and improve tolerance to damage in both data and finder patterns. Error detection and correction capability of the symbol is increased by providing additional means of recognizing the location of damage. Further, efficiency and reliability of the finder pattern is increased.

Figure 1:
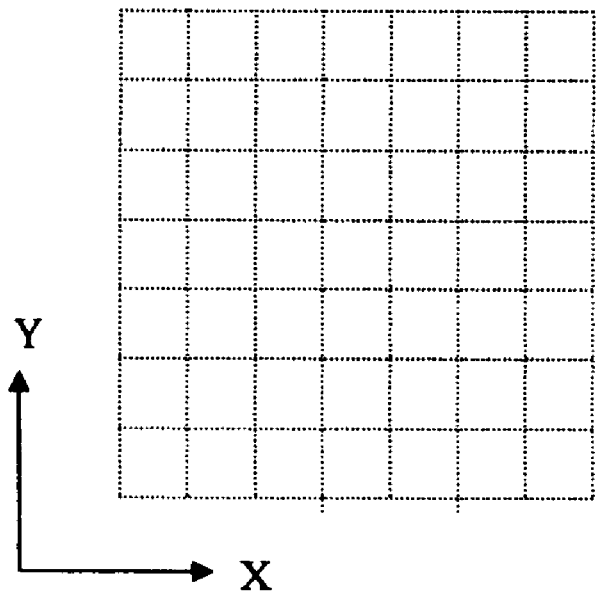
FIG. 1 illustrates a rectilinear data field used in accordance with the present invention.

With reference now to FIG. 1, a symbol 10 of the present invention may be comprised of a rectilinear data field 12 having a plurality of data cells 14 arranged in a matrix. A 7 by 7 matrix is illustrated, although it will be appreciated by those skilled in the art that the size of the matrix and the number of data cells can be varied in order to achieve the same results. As shown by the x and y coordinates, the symbol 10 is a two-dimensional rectilinear data field 12.

Figure 2:
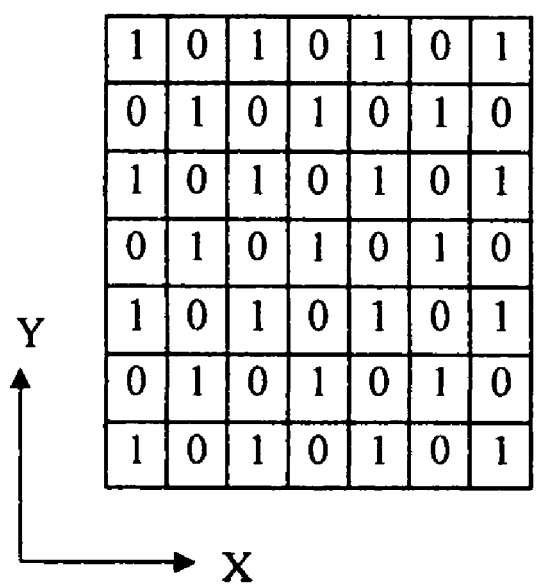
FIG. 2 illustrates the assignment of data pattern binary values to data cells within the field of FIG. 1.

With reference now to FIG. 2, binary data 16 and 18, "zero" and "one", are assigned to each data cell. The mapping of this binary data 16 and 18 creates a data pattern. As illustrated in FIG. 2, the binary data 16 and 18 consist of 49 alternating ones and zeros mapped into the 7 by 7 data field matrix. Of course, other data patterns can be created such that the binary data is not alternating, but forms another pattern. Each data cell 14 need not necessarily be assigned a binary value 16 or 18. In fact, two distinct data patterns could be created in the illustrated matrix by assigning a sub-plurality of the data cells 14 a first pattern, and a second sub-plurality of data cells another data pattern. Alternatively, each data cell could be assigned a different binary data value so that the data patterns are in effect overlapping.

Figure 3:
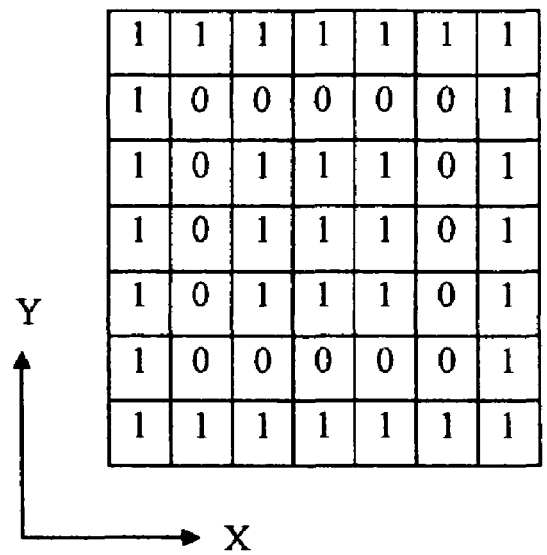
FIG. 3 illustrates the assignment of finder pattern binary values to the data cells.

With reference now to FIG. 3, a finder pattern 22 is illustrated and comprised of the assignment of the binary data in the form of ones and zeros to the data cells 14. As illustrated in FIG. 3, this particular finder pattern consists of three concentric squares of alternating values mapped onto the 7 by 7 matrix data field 12. A 3 by 3 block of data cells are assigned a "one" value, data cells surrounding this block are assigned a "zero", and the outermost data cells 14 are again assigned a "one". Thus, the illustrated finder pattern 22 comprises three concentric squares of 3 by 3, 5 by 5, and 7 by 7, from smallest to largest. Of course, those skilled in the art will appreciate that other finder patterns may be created by altering the assignment of the binary data to the individual data cells 14. Also, although each data cell 14 is illustrated as being assigned a binary value, it should be understood by the reader that not necessarily all of the data cells 14 need be assigned a finder pattern value. However, in a particularly preferred embodiment, at least some of the data cells 14 will be simultaneously assigned a binary data value and a binary finder value so that informational density is increased.

To create the graphic symbol 10, the finder pattern 22 and data pattern 20 are superimposed using a color assignment function. The color assignment function is based on certain principles of light. The color of light is related to its wavelength. White light results from the combination of various wavelengths from across the visible spectrum. One method of generating white light is to combine light from the primary colors—red, green, and blue. Material objects may selectively absorb some wavelengths and reflect others. For example, when illuminated with white light, a "blue" object strongly reflects light of wavelengths associated with the blue part of the visible spectrum and absorbs light of other wavelengths. If a "blue" object is illuminated with a red light it will appear dark compared to a "red" object illuminated the same way because the "blue" object will absorb much of the red wavelength light while the "red" object will reflect the red light. For the same reasons, if a "red" object is illuminated with a blue light it will appear dark compared to a "blue" object. Secondary colors reflect pairs of primary colors and absorb their complementary color. For example, the color "yellow" reflects both red and green and absorbs the color blue. Thus, a "yellow" object would appear dark under blue illumination and appear light when illuminated with either red or green light.

Each object color will fall into categories of relatively dark or relatively light according to the color of the illumination. This principle permits multiple binary values to be encoded in a single color and their separate binary states to be recovered in turn by making observations under an appropriate series of illumination colors. Alternatively, white light can be used and the observations can be made through an appropriate series of color filters. Another alternative is to use an electronic device, such as a color camera, and apply a series of software color filters that selectively consider the RGB components of the image. The software color filter alternative has the advantages of not requiring moving parts and of being useful in sunlight and normal indoor lighting conditions. Whichever alternative is used, the relative dark or light observations can be assigned to binary states by applying a threshold. For example, observations with intensities below a certain threshold are associated with binary "0" and observations with intensities at or above the threshold are associated with binary "1". The principles described herein apply to wavelengths in the invisible, such as infrared or ultraviolet, as well as the visible spectrum. The term "color" herein is intended to cover both the visible as well as the invisible wavelength.

An exemplary color assignment function is illustrated in FIG. 5. The data cells 14 of the symbol 10 are assigned color values based on the values of the corresponding location and the data and the finder pattern binary maps. As illustrated, a data cell having a binary value of "zero" for both the data pattern value and finder pattern value is assigned the color white. A data cell 14 having a binary data value of "zero" for the data pattern, yet a binary data value of "one" for the finder pattern value is assigned the color green. A data cell 14 having a binary data pattern value of "one" and a finder pattern value of "zero" is assigned the color red. Lastly, in this example, a data cell 14 having a data pattern value of "one" and a finder value pattern of "one" is assigned the color blue. A resultant graphic symbol 10 produced using the colors determined by this function is illustrated in FIG. 6 (B=Blue; R=Red; G=Green and W=White). Of course, a different resulting graphic symbol would be produced using different data patterns and finder patterns, or a different function for assigning color.

Figure 4:
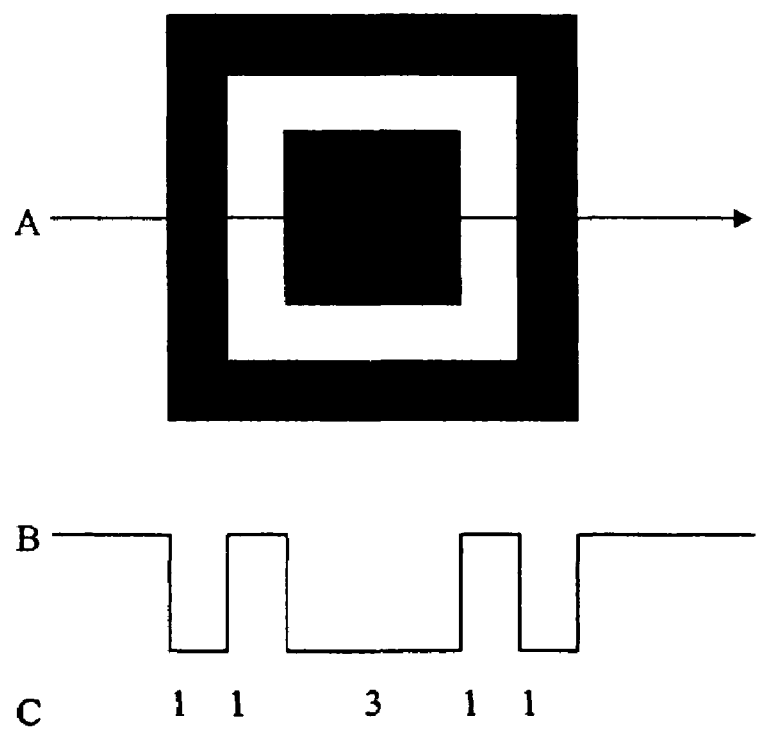
FIGS. 4A–4C illustrate bar widths measured as a scan line passes through the center of the finder pattern.
Figure 7:
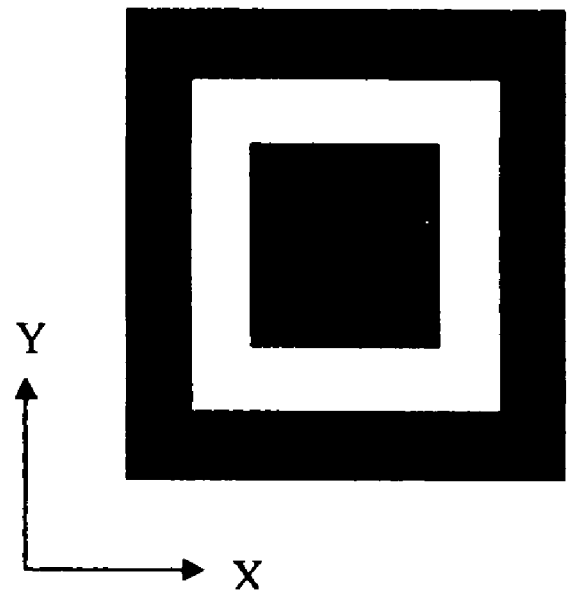
FIG. 7 illustrates the appearance of the symbol when illuminated with red light.

When viewed under green illumination, or through a green color filter, or processed in software considering the green component, the symbol 10 appears as illustrated in FIG. 7 and a finder pattern 22 becomes visible. During reading, this finder pattern 22 is located by passing a scan line 24 across the center of the finder pattern 22 or symbol 10 and detecting bar thickness ratios of 1:1:3:1:1, as depicted in FIGS. 4A–C.

Figure 8:
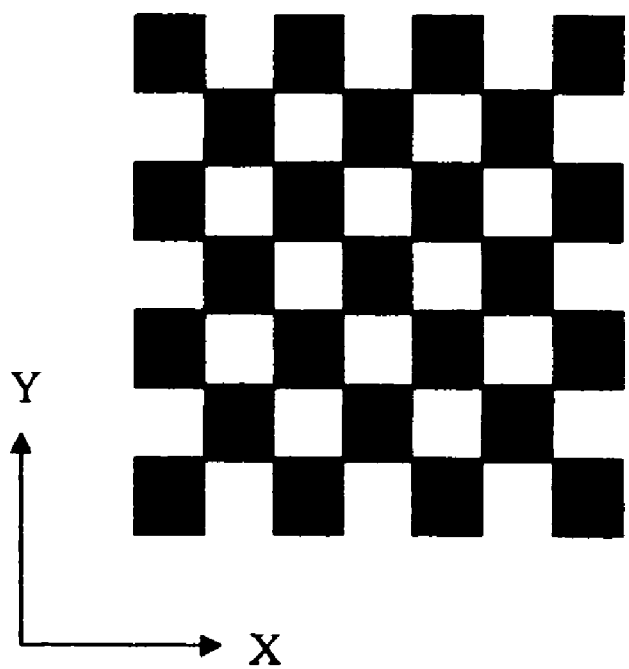
FIG. 8 illustrates the appearance of the symbol when illuminated with green light.

With reference now to FIG. 8, when the symbol 10 is exposed to red illumination or viewed through a red color filter, or processed in software considering the red component, the symbol 10 appears as illustrated and reveals the binary state of the data cells 14 to reveal the data pattern 20. Thus, in the illustrated preferred embodiment, the finder pattern 22 occupies the same space as the data 20 itself, adding no spatial overhead.

It will be obvious to those skilled in the art that the input to the color assignment function could include two or more data patterns in addition to a finder pattern. This would allow the symbol 10 to encode alternative messages for different purposes and support authentication. The assigned "colors" could be outside of the visible range, such as infrared or ultraviolet, yet still readable by the machine.

As mentioned above, it will be readily apparent to those skilled in the art that the symbol 10 could be rendered with different color assignment functions than that used in the foregoing description of the preferred embodiment. Nor is the present invention limited to the particular finder pattern or matrix size or configuration described above.

The finder pattern 22, as in the foregoing illustrated and described example, may be as large as the total data area 20 by completely overlapping the data area 20, thus maximizing the reliability of accurately finding the symbol 10. Of course, it will be appreciated by those skilled in the art that the finder pattern 22 may only overlap with a portion of the data area 20.

Another benefit of the present invention is that symbol damage is unlikely to change a data cell 14 from its intended state to the color of its opposite state as frequently occurs in primary or prior art binary data encoded as light or dark areas. For example, if the value states of the given cell are green and red, then the existence and location of damage that resulted in any other colors could be determined during image processing. The prior knowledge of the location of damage greatly enhances and extends commonly known EDAC technique such as Reed-Solomon encoding.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A machine readable symbol, comprising:
   a data field comprised of a plurality of data cells, each data cell being assigned a color corresponding to a data pattern value, a finder pattern value or an overlapping data pattern value and finder pattern value;
   wherein a finder pattern is discernable when the symbol is subjected to a first color filter means; and
   wherein a data pattern is discernable when the symbol is subjected to a second color filter means.

2. The symbol of claim 1, wherein the first color filter means comprises a first color illumination source.

3. The symbol of claim 1, wherein the second color filter means comprises a second color illumination source.

4. The symbol of claim 1, wherein the first color filter means comprises a first color filter through which the symbol is viewed.

5. The symbol of claim 1, wherein the second color filter means comprises a second color filter through which the symbol is viewed.

6. The symbol of claim 1, wherein the first color filter means comprises an electronic device adapted to process the symbol image in accordance with a first color filter.

7. The symbol of claim 1, wherein the second color filter means comprises an electronic device adapted to process the symbol image in accordance with a second color filter.

8. The symbol of claim 1, wherein the data cells are arranged into a matrix defining a rectilinear data field.

9. The symbol of claim 1, wherein the color assigned to at least one of the plurality of data cells is in the visible light spectrum.

10. The symbol of claim 1, wherein the color assigned to at least one of the plurality of data cells is in the invisible light spectrum.

11. The symbol of claim 10, wherein the assigned color is in the infrared or ultraviolet light spectrum.

12. The symbol of claim 1, wherein at least one data cell is assigned a color corresponding to an overlapping data pattern value and finder pattern value.

13. The symbol of claim 12, wherein each data cell is assigned a color corresponding to an overlapping data pattern value and a finder pattern value.

14. The symbol of claim 1, wherein at least one of the plurality of data cells is assigned a color corresponding to multiple data pattern values.

15. The symbol of claim 14, wherein each data cell is assigned a color corresponding to multiple data pattern values.

16. The symbol of claim 1, wherein each data cell is assigned a binary value corresponding to a data pattern value or a finder pattern value.

17. A machine readable symbol, comprising:
   a data field comprised of a plurality of data cells, each data cell being assigned a color corresponding to a data pattern value or a finder pattern value, or an overlapping data pattern value and finder pattern value, wherein at least a subplurality of the data cells are assigned an overlapping data pattern value and finder pattern value;
   wherein a finder pattern is discernable when the symbol is subjected to a first color filter by viewing the symbol through a first color filter, exposing the symbol to a first color light source, or utilizing an electronic device to process the symbol image in accordance with a first color filter; and wherein a data pattern is discernable when the symbol is subjected to a second color filter by viewing the symbol through a second color filter, exposing the symbol to a second color light source, or utilizing an electronic device to process the symbol image in accordance with a second color filter.

18. The symbol of claim 17, wherein each data cell is assigned a color corresponding to an overlapping data pattern value and a finder pattern value.

19. The symbol of claim 17, wherein the color assigned to each data cell is either in the visible or invisible light spectrum.

20. The symbol of claim 17, wherein at least a subplurality of the data cells are assigned a color corresponding to a finder pattern value and multiple data pattern values.

21. The symbol of claim 17, wherein at least a subplurality of the data cells are assigned a color corresponding to multiple data pattern values.

22. The symbol of claim 17, wherein the data pattern values and finder pattern values comprise a binary value.

23. A method for creating and reading a machine readable symbol, comprising the steps of:
  creating a data field having a plurality of data cells;
  assigning a data pattern value at least some of the data cells;
  assigning a finder pattern value to at least some of the data cells, wherein at least one data cell is assigned an overlapping finder pattern value and a data pattern value;
  assigning a color to each data cell, the color corresponding to the data pattern value, the finder pattern value, or an overlapping data pattern value and finder pattern value;
  subjecting the symbol to a first filter to discern a finder pattern; and
  subjecting the symbol to a second filter to discern a data pattern.

24. The method of claim 23, wherein the first filter subjecting step comprises viewing the symbol through a first color filter, exposing the symbol to a first color light source or using an electronic device to process the symbol image in accordance with a first color filter.

25. The method of claim 23, wherein the second filter subjecting step comprises viewing the symbol through a second color filter, exposing the symbol to a second color light source or using an electronic device to process.

26. The method of claim 23, wherein the plurality of data cells are arranged into a matrix defining a rectilinear data field.

27. The method of claim 23, wherein the assigning data pattern value step comprises assigning a binary value to at least a subplurality of data cells.

28. The method of claim 23, wherein the assigning finder pattern value step comprises assigning a binary value to at least a subplurality of data cells.

29. The method of claim 23, including the step of determining the location of symbol damage using a color filter.

* * * * *